(12) United States Patent
Martin et al.

(10) Patent No.: US 6,372,148 B1
(45) Date of Patent: *Apr. 16, 2002

(54) APPARATUS FOR PURIFYING SPAS/JETTED TUBS

(75) Inventors: Frank G. Martin, San Luis Obispo; Dennis Lavelle, Paso Robles, both of CA (US)

(73) Assignee: Del Industries, Inc., San Luis Obispo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/684,222

(22) Filed: Oct. 6, 2000

Related U.S. Application Data

(63) Continuation of application No. 09/257,745, filed on Feb. 25, 1999, now Pat. No. 6,129,850
(60) Provisional application No. 60/090,771, filed on Jun. 26, 1998.

(51) Int. Cl.[7] .................................................. C02F 1/78
(52) U.S. Cl. .................. 210/760; 210/765; 210/169; 210/192; 210/198.1; 422/186.07; 422/186.15
(58) Field of Search ................................. 210/760, 765, 210/169, 192, 198.1; 422/186.07, 186.15

(56) References Cited

U.S. PATENT DOCUMENTS

| | | | |
|---|---|---|---|
| 4,352,740 A | * | 10/1982 | Grader et al. |
| 4,713,220 A | * | 12/1987 | Huynh et al. |
| 5,032,292 A | * | 7/1991 | Conrad |
| 5,824,243 A | * | 10/1998 | Contreras |

* cited by examiner

*Primary Examiner*—Betsey Morrison Hoey
(74) *Attorney, Agent, or Firm*—Stout, Uxa, Buyan +Mullins, LLP; Frank J. Uxa

(57) ABSTRACT

Apparatus and methods for purifying the water in spas or hot tubs are provided. Such apparatus include an ozone generator sized and adapted to purify the water in a spa or jetted tub, the ozone generator including a chip electrode assembly adapted to produce ozone from air using an electric discharge; and a transfer assembly cooperating with said ozone generator to pass ozone produced by the ozone generator to the water in the spa or jetted tub.

24 Claims, 3 Drawing Sheets

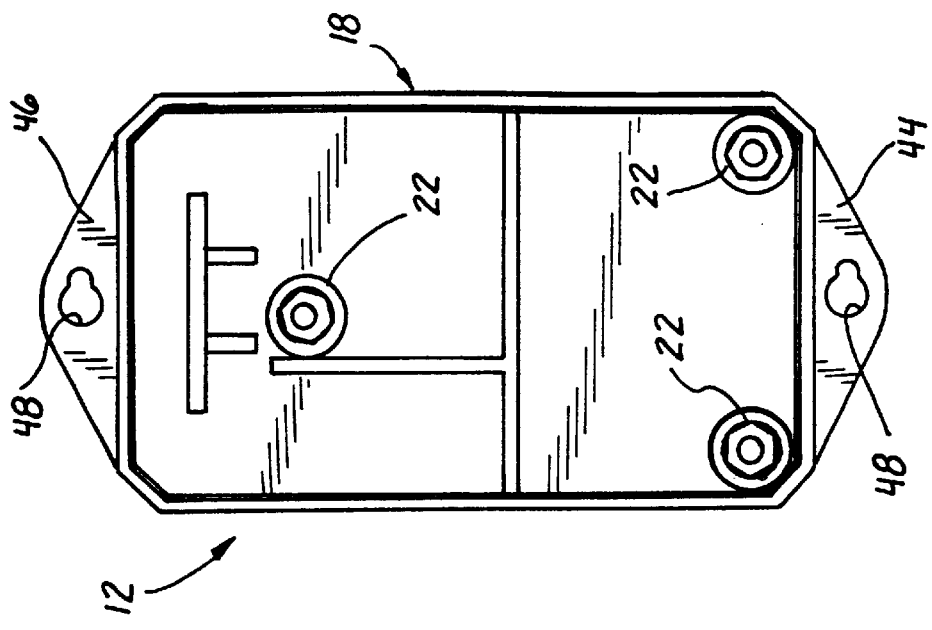
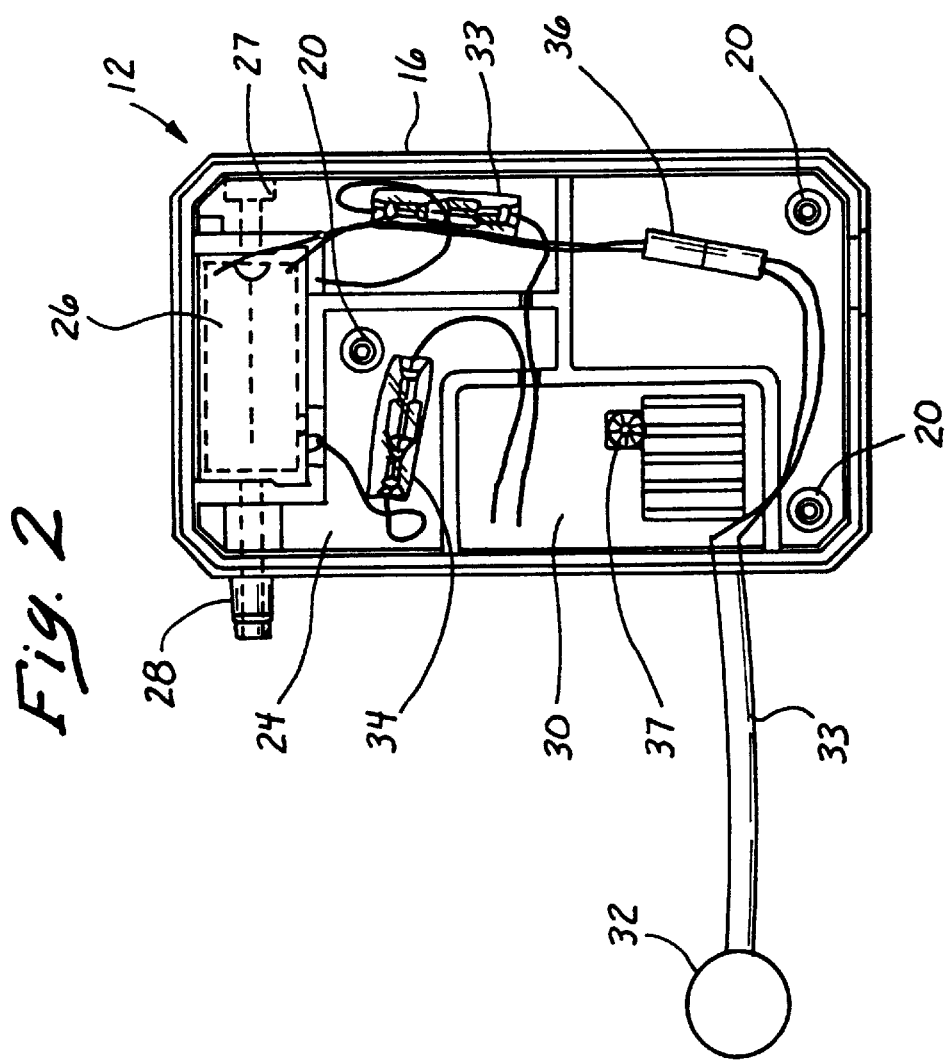

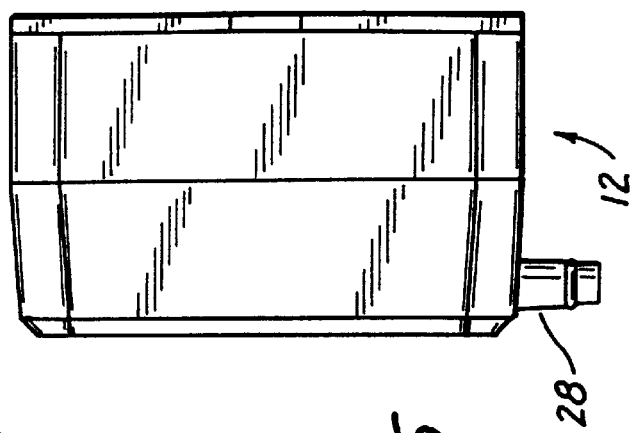
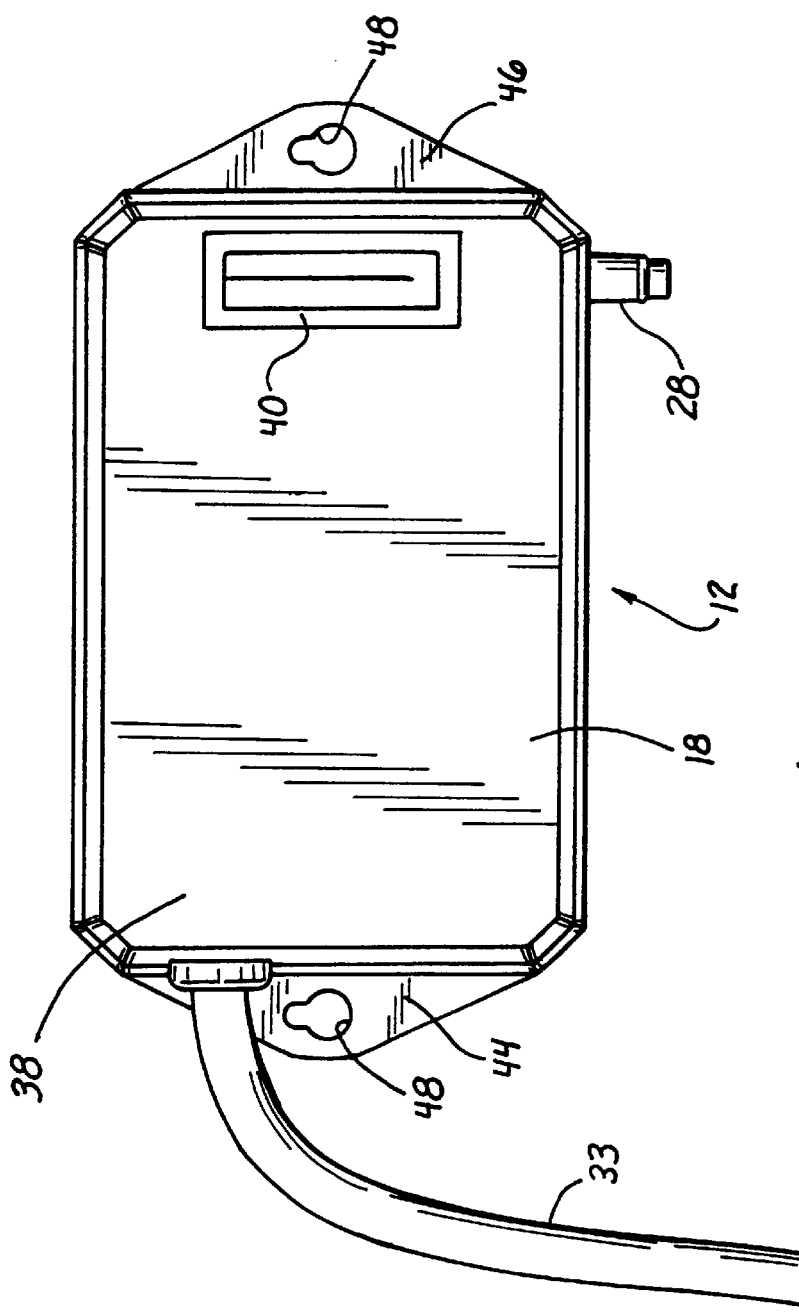

APPARATUS FOR PURIFYING SPAS/JETTED TUBS

CROSS REFERENCE TO RELATED APPLICATIONS

This is a continuation of application Ser. No. 09/257,745, filed Feb. 25, 1999, now U.S. Pat. No. 6,129,850 which application claims the benefit of U.S. Provisional Application No. 06/090,771, filed Jun. 26, 1998.

BACKGROUND OF THE INVENTION

The present invention relates to systems of purifying waters used in spas and jetted tubs. More particularly, the invention relates to apparatus and methods specifically configured and adapted for the treatment, for example, for the purification, of waters used in spas and jetted tubs.

Spas, jetted (hot) tubs and the like are often treated with active compounds to maintain the water therein in a purified or sanitized condition. Compounds, such as chlorine and ozone, have been used to sanitize the relatively large volumes, for example, hundreds or thousands of gallons, of water in such spas, tubs, etc. As used herein, the terms "spa" and "jetted tub" refer to systems which hold or contain a body of liquid aqueous medium, hereinafter referred to as water, which is often heated, in a reservoir which is smaller than a swimming pool, but is sufficiently large so that an adult human being can be completely submerged or immersed in the water contained in the reservoir.

Spas are often used by submerging all or a major portion of one's body in the water in the reservoir for recreation and/or relaxation. Additional, separate purifying or sanitizing components are also included in spa waters to control bacteria, algae, etc., which are known to contaminate such waters. Very low concentrations of these active materials are used in order to avoid harming sensitive parts of the body—since such spas, tubs, etc. are sized so that the entire body can be immersed in the water and to minimize costs, because of the relatively large volume of water to be treated. For example, the normal (that is the typical, non-acute contamination) concentration of ozone used to purify or sanitize the water in a spa or tub is often in the range of about 0.005 to about 0.05 parts per million (ppm) based on weight of ozone per volume of water (w/v).

Typically, ozone is generated on site for use in purifying spa/tub waters. Conventional ozone generators used for such service include a sealed ultraviolet (UV) light lamp which is known to produce ozone in the desired amounts. Such conventional ozone generators are generally effective. However, these generators do have certain drawbacks. For example, the UV light lamp is relatively bulky, can burn out (often requiring system disassembly and lamp replacement) and are relatively in efficient in producing the desired amounts of ozone.

Therefore, it would be advantageous to provide new systems for purifying waters used in spas and jetted tubs.

SUMMARY OF THE INVENTION

New systems, for example, apparatus and methods, for purifying the waters in spas and jetted tubs have been discovered. The new systems employ ozone as the purifying/sanitizing component. The ozone is generated using an assembly which is compact, durable, convenient, reliable, requires little or no maintenance and generates ozone efficiently, for example, more efficiently than a conventional UV light lamp ozone generator. Such an ozone generator is particularly effective in producing purifying amounts of ozone for spas and jetted tubs used for recreation and/or relaxation. The owners of such spas and jetted tubs want to use these items when desired, want the water to be effectively purified/sanitized, but do not want to spend large amounts of time/money on maintenance. The systems of this invention meet these requirements.

In one broad aspect, the present apparatus for purifying the water in a spa or jetted tub comprise an ozone generator and a transfer assembly. The ozone generator is sized and adapted to purify the water in a spa or jetted tube, and includes a chip electrode assembly adapted to produce ozone from air using an electric discharge. The transfer assembly cooperates with the ozone generator to pass ozone produced by the ozone generator to the water in the spa or jetted tub.

Preferably, the ozone generator is effective to produce sufficient ozone to purify (sanitize) the water in a spa or jetted tub containing about 50 or about 200 to about 1000 or about 5000 gallons of water. The concentration of ozone in the water in the spa/jetted tub is generally as noted elsewhere herein. Two or more ozone generators in accordance with the present invention can be utilized together if larger volumes of water are to be treated.

In one particularly useful embodiment, the chip electrode assembly is adapted to produce ozone from air using a corona discharge. The ozone generator preferably further includes a transformer (an electrical transformer) sized, adapted and located to control the electric power (voltage) provided to the chip electrode assembly. Often, the ozone generator operates on conventional line voltage. For example, the transformer may be adapted to function by being provided with (to be inputted with) supply (e.g., line) A.C. electric power of about 100 to about 130 volts.

Alternatively, a 12 volt D.C. system may be employed to supply electric power.

One specific ozone generator useful in the present invention is the generator sold by Del Industries under the trademark ZO-CDS or CDS16. The specifications for the CDS16 ozone generator include power: 110–120 VAC, 50/60 Hz, 90 mA and 11 W; flow: 3 SCFH or 1415 cc/min; and weight: 12 oz or 340 g.

Any suitable transfer assembly may be utilized provided that it functions to cooperate with the ozone generator to pass ozone produced by the ozone generator to the water in the spa or jetted tub.

The transfer assembly preferably includes a water pump, an adductor assembly and a transfer conduit. The adductor (or venturi) assembly has an inlet and an outlet. The transfer conduit is adapted to provide a passage for ozone-containing gases between the ozone generator and the adductor assembly. The water pump is positioned to pump water from the spa or jetted tub through the adductor assembly. The transfer conduit is positioned so that the passage of water through the adductor assembly causes ozone-containing gases from the ozone generator to pass through the transfer conduit into and through the adductor assembly.

The water pump can be, and preferably is, the spa/jetted tub water pump, that is the pump used to circulate water in the spa/jetted tub. In one useful embodiment, the adductor assembly is located in a bypass conduit and a minor amount, that is less than about 50%, of the water being pumped by the water pump is passed through the bypass line.

The transfer assembly preferably includes a water transfer line which circulates water from and to the spa or jetted tub, a filter located upstream of the adductor assembly in fluid communication with the water transfer line and adapted to remove solid or particulate matter from the water passing through the water transfer line. The transfer assembly preferably further includes a heater adapted to heat the water flowing through the water transfer line upstream of the adductor assembly.

In one embodiment, the ozone transfer conduit is configured to reduce the probability of water passing from the adductor assembly to the ozone generator. This feature is designed to avoid detrimentally affecting the ozone generator. For example, the ozone transfer conduit may include a water trap. The ozone transfer conduit may include a loop (for example, a water trap loop), preferably located above the adductor assembly, to reduce the risk of water contacting the ozone generator. The ozone generator preferably is located above the water level in the spa/jetted tub. The present apparatus may include a check valve, for example, of conventional design, located in the ozone transfer conduit and adapted to prevent fluid flow in the ozone transfer conduit toward the ozone generator.

Methods for purifying/sanitizing waters located in spas and jetted tubs are included within the scope of the present invention. Preferably, these methods comprise employing the present apparatus to provide a purifying/sanitizing amount of ozone to the water located in the spa/jetted tub.

Any combination of two or more features described herein are included within the scope of the present invention provided that the features in each such combination are not mutually inconsistent.

These and other aspects and advantages of the present invention are apparent in the following detailed description and claims, particularly when considered in conjunction with the accompanying drawings in which like parts bear like reference numerals.

BRIEF DESCRIPTION OF THE DRAWINGS

FIG. 2 is a plan view of the ozone generator used in the embodiment shown in FIG. 1 with the housing cover removed.

FIG. 3 is a plan view of the inner surface of the housing cover of the ozone generator used in the embodiment shown in FIG. 1.

FIG. 4 is a top plan view of the ozone generator used in the embodiment in FIG. 1.

FIG. 5 is a side plan view of the ozone generator used in the embodiment in FIG. 1.

DETAILED DESCRIPTION OF THE PREFERRED EMBODIMENT

Figure 1:
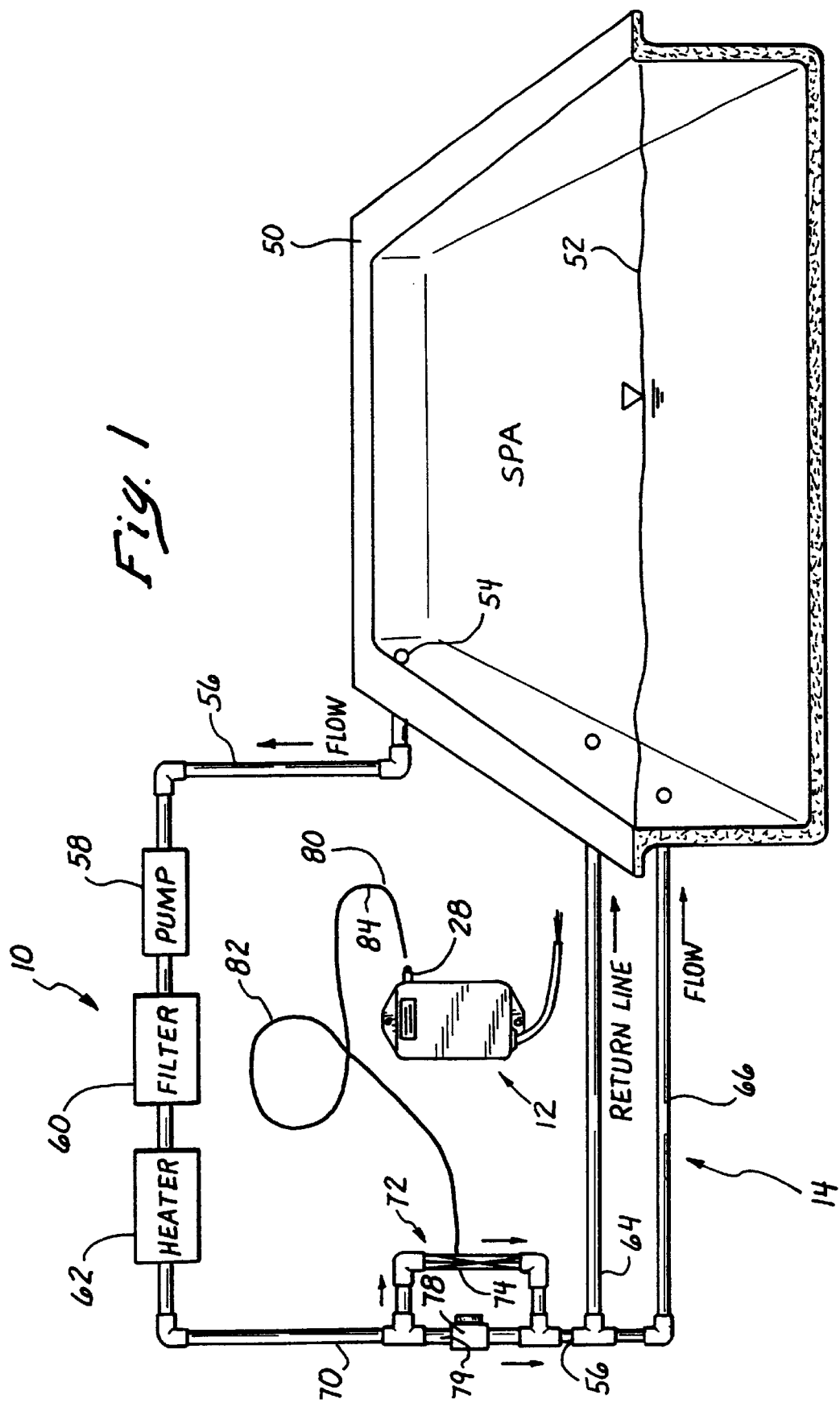
FIG. 1 is a generally schematic illustration showing an embodiment of the present invention in use in purifying the water in a spa.

Referring now to the drawings, the present purification apparatus, shown generally at 10, includes an ozone generator, shown generally at 12, and a transfer assembly, shown generally at 14. Ozone generator 12 includes a housing body 16 and a housing cover 18 which is adapted to be joined or connected to the housing body by coupling threaded inserts 20 through complimentary cover holes 22 with threaded screws (not shown).

With housing cover 18 secured to housing body 18, ozone generator 12 is in the form of a compact, closed unit. Located within the space 24 between the housing body 16 and housing cover 18 is an ozone-producing corona discharge chip electrode 26. Ozone-containing gases produced from air, which enters housing body 16 through air inlet 27 in the housing, by chip electrode 26 exit the housing through housing outlet 28, which can be an integral part of the housing body 16. The air inlet may, and preferably does, include a particulate filter, for example, of conventional construction. Both the housing body 16 and housing cover 18 can be made from any suitable material or materials of construction. Preferably, these components are made of polymeric material. The ozone generator 12 typically has a length in a range of about 4 inches to about 10 inches, a width in a range of about 1 inch to about 6 inches and a thickness of about 0.5 inch to about 4 inches.

An electrical transformer 30, of conventional design, is included within space 24. Electrical transformer 30 processes line power, e.g., 120V, from source 32 through power cord 33 into power suitable for use by chip electrode 26. Transformer 30 is a "step up" transformer in that the chip electrode 26 uses power having a voltage in the range of about 3000 to about 5000 volts and a frequency in the range of about 18 KHz to about 20 KHz. A series of electrical connectors 33, 34 and 36 are included within space 24 and are adapted to connect electric wires so as to provide electric power from source 32 ultimately to chip electrode 26. These connectors are adapted to be easily removed to allow maintenance of generator 12. A variable potentiometer 37 is provided and is used to control or adjust the ozone output of generator 12.

The top 38 of housing cover 18 includes a transparent window 40 through which the spa owner can visually observe chip electrode 26, which glows when ozone is being produced. This glow diminishes over time as the chip electrode 26 becomes less effective in producing ozone. Thus, the spa owner, by observing chip electrode 26, is provided with an indication as to when ozone generator 12 should be replaced. Atmospheric air from air inlet 27 is directed to come in contact with the chip electrode 26 to produce an ozone-containing gas which passes through housing outlet 28.

In addition, the housing cover 18 includes two end tabs 44 and 46, each of which includes a through hole 48 through which screws can be passed to secure the ozone generator 12 in place in a suitable stationary position.

Ozone generator 12 operates as shown in FIG. 1. Spa 50 includes a quantity of heated and circulating water 52, for example, about 500 to 1000 gallons in volume. The spa 50 is equipped with a water circulating system in which water from the spa passes through spa outlet 54 into conduit 56 through spa pump 58, spa filter 60 and spa heater 62. Eventually the pumped, filtered and heated water is passed back to the spa 50 through return lines 64 and 66.

In the present invention, piping segment 70 (a part of conduit 56), downstream of heater 62 is divided to provide a bypass line, shown generally at 72. Bypass line 72 includes a venturi assembly 74, of generally conventional construction, which acts as an ozone adductor to suction ozone-containing gases from ozone generator 12 into bypass line 72. The combined ozone-containing gases and water is returned to the main water conduit 56, as shown in FIG. 1. A valve 78, of conventional design, is located in water conduit 79 and can be adjusted to control the amount of water passed through bypass line 72. The ozone-containing gases from ozone generator 12 are passed through housing outlet 28 and through ozone conduit 80 into the water flowing through bypass line 72. The suction created by venturi assembly 74 causes ozone to flow through ozone conduit 80.

Ozone conduit 80 includes a water trap loop 82 located above venturi assembly 74. This water trap loop 82 acts to protect the ozone generator from being exposed to water in line 56 and bypass line 72. In addition, ozone conduit 80 includes a check valve 84, of conventional construction, which effectively prevents fluid flow in the ozone conduit back to the ozone generator 12. This feature inhibits, or even substantially prevents, any water from line 56 and bypass line 72 from entering ozone generator 12.

Apparatus 10 functions as follows. When it is desired to purify/sanitize the water 52 in spa 50, operation of the pump 58 and ozone generator 12 is initiated. This causes water 52 to flow from spa 50 through line 56 into pump 58, filter 60, heater 62 into piping segment 70. At this point, a minor amount, that is less than about 50%, of the total water passing through segment 70 is caused to flow through bypass line 72 and venturi assembly 74. This causes ozone-containing gases being generated by ozone generator 12 to pass through ozone conduit 80 into the water in bypass line 72, which is ultimately returned to the spa via return line 64 and 66.

Sufficient ozone is produced in accordance with the present invention to purify/sanitize the water 52 in spa 50 and/or to maintain such water in the desired purified/sanitized state.

The present ozone generator provides a very compact structure which: is easily and conveniently mounted for use in a spa/jetted tub application; requires relatively reduced amounts of maintenance; is cost effective to produce and use; and effectively and efficiently produces ozone in sufficient quantities to perform the desired spa/jetted tub purification/sanitation service.

While this invention has been described with respect to various specific examples and embodiments, it is to be understood that the invention is not limited thereto and that it can be variously practiced within the scope of the following claims.

What is claimed is:

1. An apparatus for purifying the water in a spa or jetted tub having a water circulation system, the apparatus comprising:
   an ozone generator including a chip electrode assembly adapted to produce ozone using an electric discharge; and
   a transfer assembly, including a transfer conduit connected to the ozone generator, and an adductor assembly connected to the transfer conduit and adapted to draw ozone containing gases from the ozone generator; and
   a bypass line adapted to be connected to the water circulation system of the spa or jetted tub, wherein the adductor assembly is located within the bypass line such that the bypass line is effective to direct the water circulating to the spa or jetted tub to pass through the adductor assembly before being returned to the water circulation system, in order to provide ozonated water having a concentration effective in sanitizing the water in the spa or jetted tub.

2. The apparatus of claim 1 wherein the bypass line is effective to direct a portion of the water being circulated to the spa or jetted tub to pass through the adductor assembly.

3. The apparatus of claim 2 further comprising a valve mechanism adapted to control the portion of water being passed through the bypass line.

4. The apparatus of claim 1 wherein the bypass line is effective to direct a minor portion of the water being circulated to the spa or jetted tub to pass through the adductor assembly.

5. The apparatus of claim 1 wherein the transfer conduit includes a water trap loop configured to reduce a risk of water passing into the ozone generator.

6. The apparatus of claim 1 wherein the chip electrode assembly comprises a corona discharge chip electrode.

7. The apparatus of claim 1 wherein the ozone generator further includes a transformer sized, adapted and located to control electric power provided to the chip electrode.

8. The apparatus of claim 7 wherein the transformer is adapted to be provided with a supply power of about 100 volts to about 130 volts.

9. The apparatus of claim 1 further comprising the water circulation system, the water circulation system comprising
   a main water conduit adapted to circulate water from and to the spa or jetted tub, and
   a water pump connected to the main water conduit and positioned to pump water from the spa or jetted tub through the bypass line and adductor before being returned to the main water conduit.

10. The apparatus of claim 9 wherein the bypass line is effective to direct a portion of the water being circulated to the spa or jetted tub to pass through the adductor assembly.

11. The apparatus of claim 10 further comprising a valve mechanism adapted to control the portion of water being passed through the bypass line.

12. The apparatus of claim 9 wherein the bypass line is effective to direct a minor portion of the water being circulated to the spa or jetted tub to pass through the adductor assembly.

13. The apparatus of claim 9 further comprising a heater adapted to heat the water in the main water conduit, the heater located upstream of the adductor assembly.

14. An apparatus for purifying the water in a spa or jetted tub, the apparatus comprising:
   a water circulation system including a main water conduit adapted to be connected to a pump positioned to circulate water through the main water conduit from and to the spa or jetted tub;
   an ozone generator including a chip electrode assembly adapted to produce ozone using an electric discharge;
   a transfer assembly, including a transfer conduit connected to the ozone generator, and an adductor assembly connected to the transfer conduit and adapted to draw ozone containing gases from the ozone generator; and
   a bypass line connected to the main water conduit, the bypass line being effective for directing the water being pumped through the main water conduit to pass through the adductor assembly before being returned to the main water conduit, in order to provide ozonated water having a concentration effective in sanitizing the water in the spa or jetted tub.

15. The apparatus of claim 14 wherein the bypass line is effective to direct a minor portion of the water being circulated to the spa or jetted tub to pass through the adductor assembly.

16. The apparatus of claim 14 further comprising a valve mechanism adapted to control a portion of water being passed through the bypass line.

17. The apparatus of claim 14 wherein the transfer conduit includes a water trap loop configured to reduce a risk of water passing into the ozone generator.

18. The apparatus of claim 14 wherein the chip electrode assembly comprises a corona discharge chip electrode.

19. The apparatus of claim 18 wherein the ozone generator further includes a transformer sized, adapted and located to control electric power provided to the chip electrode.

20. The apparatus of claim 19 wherein the transformer is adapted to be provided with a supply power of about 100 volts to about 130 volts.

21. The apparatus of claim 14 further comprising a heater adapted to heat the water in the main water conduit, the heater located upstream of the adductor assembly.

22. An apparatus for purifying the water in a spa or jetted tub, the apparatus comprising:

a water circulation system including a main water conduit and a pump adapted to pass water from and to the spa or jetted tub;

an ozone generator adapted to produce ozone in an amount effective to purify the water in the spa or jetted tub, the ozone generator including a chip electrode assembly adapted to produce ozone using an electric discharge; and a transfer assembly, including a transfer conduit connected to the ozone generator, and an adductor assembly connected to the transfer conduit and adapted to draw ozone containing gases from the ozone generator;

a bypass line connected to the main water conduit, the bypass line being effective for directing a minor portion of the water being pumped through the main water conduit to pass through the adductor assembly before being returned to the main water conduit; and a valve mechanism adapted to control the portion of water being passed through the bypass line in order to provide ozonated water having a concentration effective in sanitizing the water in the spa or jetted tub.

23. A method for purifying water in a spa or jetted tub, the method comprising:

generating ozone gas using a chip electrode assembly;

drawing the ozone gas into an adductor;

circulating water to and from the spa or jetted tub through a water line;

providing a bypass line connected to the water line, wherein the adductor is connected to the water line;

passing a portion of the circulating water through the bypass line and through the adductor to allow the portion of water to become ozonated water;

combining the ozonated water with the flow of water in the water line to provide an ozonated stream having an ozone concentration effective in purifying the water; and passing the combined water and ozonated water into the spa or jetted tub.

24. The method of claim 23 further comprising the step of controlling the portion of the circulating water being passed into the bypass line.

* * * * *